United States Patent
Raaf

(10) Patent No.: US 11,451,363 B2
(45) Date of Patent: Sep. 20, 2022

(54) DIGITAL-CENTRIC FULL-DUPLEX ARCHITECTURE

(71) Applicant: Apple Inc., Cupertino, CA (US)

(72) Inventor: Bernhard Raaf, Neuried (DE)

(73) Assignee: Apple Inc., Cupertino, CA (US)

( * ) Notice: Subject to any disclaimer, the term of this patent is extended or adjusted under 35 U.S.C. 154(b) by 934 days.

(21) Appl. No.: 15/197,528

(22) Filed: Jun. 29, 2016

(65) Prior Publication Data

US 2018/0006795 A1    Jan. 4, 2018

(51) Int. Cl.
| | |
|---|---|
| H04L 5/14 | (2006.01) |
| H04B 1/525 | (2015.01) |
| H04B 1/12 | (2006.01) |
| H04B 1/44 | (2006.01) |

(52) U.S. Cl.
CPC ........... *H04L 5/1461* (2013.01); *H04B 1/123* (2013.01); *H04B 1/44* (2013.01); *H04B 1/525* (2013.01)

(58) Field of Classification Search
CPC ...... H04B 1/525; H04B 1/123; H04B 1/0475; H04B 1/0007; H04B 1/56; H04B 2001/0408; H04B 7/0417; H04B 1/62; H04B 15/02; H04B 1/715; H04L 5/14; H03M 3/458; H03M 3/464; H03M 3/502
See application file for complete search history.

(56) References Cited

U.S. PATENT DOCUMENTS

| | | |
|---|---|---|
| 2008/0107046 A1 | 5/2008 | Kangasmaa et al. |
| 2009/0186582 A1 | 7/2009 | Muhammad et al. |
| 2013/0259099 A1 | 10/2013 | Gudem et al. |
| 2015/0318976 A1 | 11/2015 | Eltawil et al. |
| 2016/0056946 A1 | 2/2016 | Moher |
| 2016/0211927 A1* | 7/2016 | Mo .......... H04B 1/123 |
| 2016/0308551 A1* | 10/2016 | Talty .......... H03F 3/24 |

FOREIGN PATENT DOCUMENTS

EP    2 8 22189 A1    1/2015

OTHER PUBLICATIONS

Bharadia, D. et al., "Full Duplex Radios," SIGCOMM '13, Aug. 12-16, 2013, 12 pages, Hong Kong, China.
Bharadia, D. et al., "Full Duplex MIMO Radios," in Proc. USENIX NSDI, 2014, 13 pages.
Riihonen, T. et al., "Analog and Digital Self-interference Cancellation in Full-Duplex MIMO-OFDM Transceivers with Limited Resolution in A/D Conversion," IEEE, Asilomar 2012, pp. 45-49.

(Continued)

*Primary Examiner* — Yemane Mesfin
*Assistant Examiner* — Mon Cheri S Davenport
(74) *Attorney, Agent, or Firm* — Kowert, Hood, Munyon, Rankin & Goetzel, P.C.

(57) ABSTRACT

A full-duplex radio device is disclosed. The full-duplex radio device includes an analog transmission (TX) circuit that includes a power amplifier to output an analog TX signal. The full-duplex radio device also includes a feedback receiver circuit coupled to the analog TX circuit. The feedback receiver circuit provides a digital representation of the analog TX signal that is used to digitally cancel at least a transmitter noise component of a self-interference signal associated with a transmission of the analog TX signal in the full-duplex radio device.

22 Claims, 7 Drawing Sheets

(56) References Cited

OTHER PUBLICATIONS

Hua, Y. et al., "Breaking the Barrier of Transmission Noise in Full-Duplex Radio," 2013 IEEE Military Communications Conference, pp. 1558-1563.
Korpi, D. et al., "Reference Receiver Based Digital Self-Interference Cancellation in MIMO Full-Duplex Transceivers," Globecom 2014 Workshop—Broadband Wireless Access, pp. 1001-2007, IEEE.
Duarte, M. et al., "Full-Duplex Wireless Communications Using Off-The-Shelf Radios: Feasibility and First Results," IEEE, Asilomar 2010, pp. 1558-1562.
European Search Report and Written Opinion on application No. 17 173 593.9, dated May 17, 2018.

* cited by examiner

DIGITAL-CENTRIC FULL-DUPLEX ARCHITECTURE

BACKGROUND

The disclosure relates to the field of wireless communications, including full-duplex architectures.

BRIEF DESCRIPTION OF THE DRAWINGS

The present disclosure described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
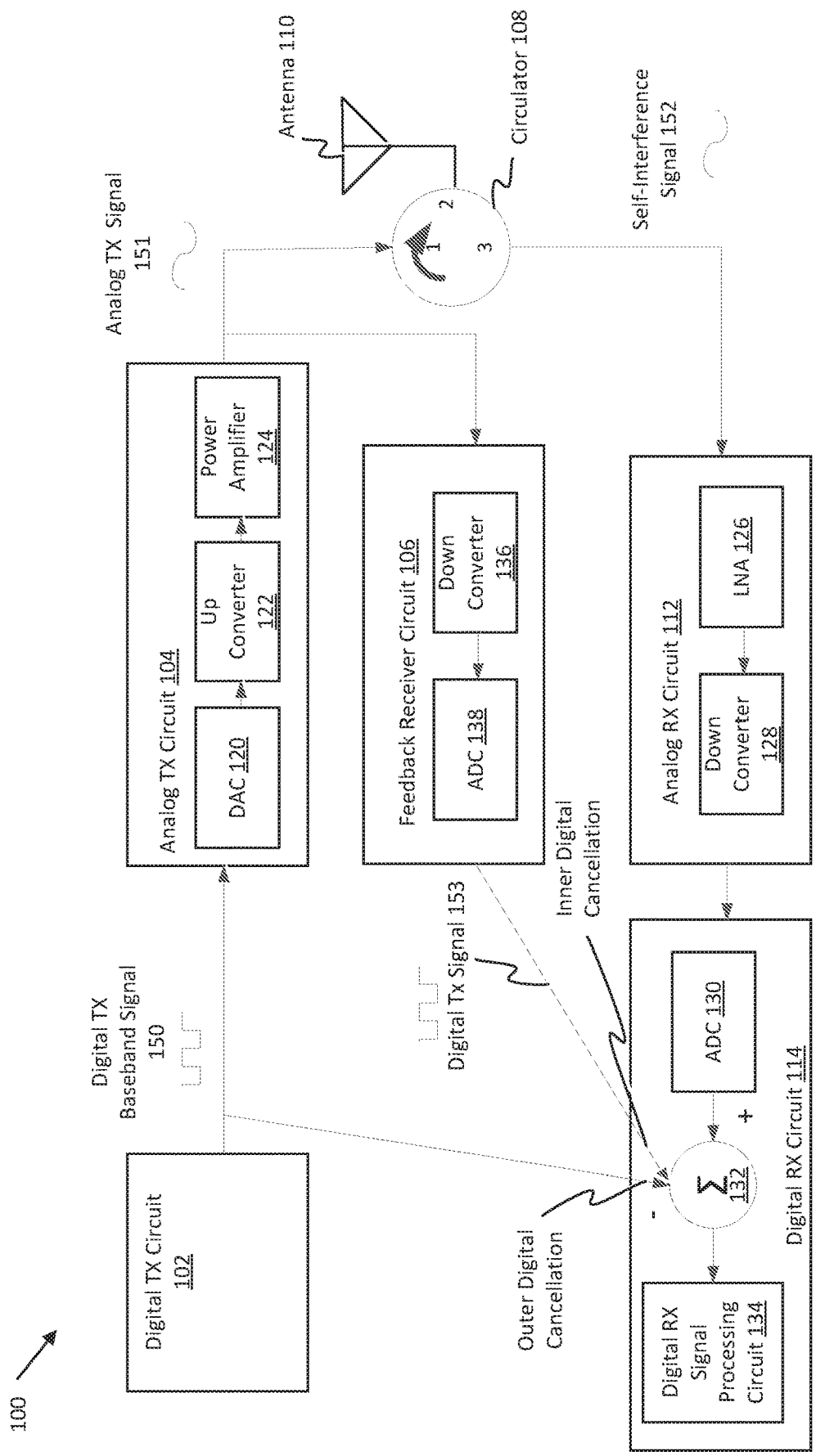
FIG. 1 is a block diagram illustrating a full-duplex system, according to some implementations.

In the following description, various aspects of the illustrative implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

Wireless communication has become ubiquitous in modern society. Wireless radios may be designed to operate in half-duplex mode, where the half-duplex radio may transmit or receive on the same frequency band (also referred to as channel), but not both simultaneously. In-band full-duplex radios may concurrently transmit and receive signals in the same frequency band. In-band full-duplex radios have tremendous implications on wireless network design, not the least of which is cutting spectrum requirements in half. For example, the Long-Term Evolution (LTE) wireless communication standard implements equal width separate uplink and downlink channels. An in-band full-duplex radio would be able to achieve the same performance using a single channel as a radio implementing LTE. In-band full-duplex may be referred to as full-duplex hereinafter, unless otherwise described. It may be noted that although the below is described as operating in full-duplex radios (also referred to as full-duplex systems, full-duplex radio systems, or full-duplex radio devices), some or all the features may be implemented in non-in-band full-duplex systems, such as duplex-free implementations of frequency-division duplex (FDD) systems.

Full-duplex radios generate self-interference signals (also referred to as self-interference) that may limit performance. When a full-duplex radio transmits a transmission (TX) signal, the receiver (RX) of the same full-duplex radio may also receive the TX signal (i.e., self-interference signal). The self-interference signal acts as unwanted noise and reduces the signal-to-noise ratio (SNR) and throughput of the full-duplex radio. Cancellation of self-interference to the noise floor of the full-duplex radio is desirable, but difficult. The noise floor may refer to the level of noise introduced by a system (or the level of background noise in a signal), below which the signal that is being captured cannot be isolated from the noise. Some of the challenges in canceling the self-interference signal arise because a full-duplex radio does not know the actual analog TX signal that the full-duplex radio transmits. The transmitted analog TX signal may look very different from its digital representation in baseband (also referred to as digital TX baseband signal). Baseband or baseband signal may refer to the original frequency range of a transmission signal (e.g., analog TX signal) before the signal is converted or modulated to a different frequency range. A baseband signal may have a very narrow frequency range where the spectral magnitude is nonzero for frequencies near the origin (e.g., frequency=0) and negligible elsewhere. The numerous analog components in the TX chain of the full-duplex radio may distort the digital TX baseband signal in both linear and non-linear ways. The self-interference signal, may include, in addition to the baseband signal (e.g., linear noise component), harmonics (e.g., non-linear noise component) from analog circuits and additional broadband noise (e.g., transmitter noise component) from the power amplifiers, for example. Simply canceling the known baseband version of the transmitted signal, without accounting for the analog distortions, may be inadequate. Techniques for canceling self-interference in full-duplex radios have been proposed but suffer from inadequate cancellation of the self-interference signal or are difficult or impractical to implement.

The present disclosure addresses the above-mentioned and other deficiencies by using a receiver circuit to tap the analog TX circuit for a copy of the transmitted analog TX signal. The feedback receiver circuit may convert the copy of the transmitted analog TX signal into a digital representation of the analog TX signal (also referred to as digital TX signal). The digital representation may be used to digitally cancel (e.g., performed in the digital domain) at least the transmission noise component of the self-interference signal.

In one implementation, the receiver circuit taps the output of the power amplifier to receive the copy of the analog TX signal. The receiver circuit converts the copy of the analog TX signal into a digital representation. The receiver circuit sends the digital TX signal to the digital receiver (RX) circuit to digitally cancel (e.g., in the digital domain) at least the transmission noise component of the self-interference signal. The digital RX circuit may cancel the linear noise component of the self-interference signal using another signal, such as the digital TX baseband signal from the digital TX circuit. In another implementation, the digital RX circuit uses the digital TX signal to digitally cancel the transmission noise component and the non-linear noise component of the self-interference signal. In still another implementation, the digital RX circuit uses the digital TX signal to cancel the transmission noise component of the self-interference signal, and the digital RX circuit cancels the linear and non-linear noise component of the self-interference signal using the digital TX baseband signal. In another implementation, digital RX circuit may cancel the linear noise component, non-linear noise component, and transmitter noise component using the digital TX signal.

In another implementation, the feedback receiver is operatively coupled to the analog TX circuit to receive a feedback cancellation signal and the analog TX signal. The feedback cancellation signal may be used cancel a part of the analog TX signal in the analog domain and prior to conversion to the digital domain (e.g., prior to the analog-to-digital converter (ADC) of the feedback receiver circuit). Analog domain may refer to data that has been converted into and is manipulated in an analog format (e.g., waveforms). For example, the analog domain may include a signal prior to being received by an ADC or a signal output from a digital-to-analog converter (DAC). Digital domain may refer to data that has been converted into and is manipulated in a digital format (e.g., bits). For example, the digital domain may include a signal prior to being received by DAC or a signal output from an ADC. Canceling a part of the analog TX signal prior to conversion to the digital domain may help reduce the dynamic range requirement of the ADC of the feedback receiver circuit. Dynamic range may be the difference (or ratio) between the smallest and largest usable signal that may be measured by a circuit or system. For example, if the feedback cancellation signal removes 30 decibels (dB) from the analog TX signal, the ADC of the feedback receiver circuit may require 30 dB less dynamic range (e.g., the ADC may be smaller by 30 dB/(6 dB/bit)=5 bits). If the feedback cancellation signal removes a portion of the analog TX signal, the remaining portion of the analog TX signal may be converted into a digital representation and used to digitally cancel at least the transmission noise component of the self-interference while reducing the dynamic range requirement of the ADC of the feedback receiver circuit.

In another implementation, in addition to the feedback receiver described above, a full-duplex radio may implement a compensating transmitter circuit to cancel at least a part of the self-interference signal (e.g., linear noise component) in the analog domain prior to the self-interference signal being converted into digital domain by the main ADC of the digital RX circuit. Similar as described above, canceling a part of the self-interference signal in the RX signal path prior to conversion to the digital domain may help reduce the dynamic range of the main ADC of the digital RX circuit.

FIG. 1 is a block diagram illustrating a full-duplex system, according to some implementations. Full-duplex system 100 may perform cancellation of self-interference signal 152 in the digital domain. It may be noted, self-interference signal 152 may contain both self-interference and other signal components, such as the wanted RX signal (e.g., a signal from another user equipment device, such as a base station). For purposes of illustration, rather than limitation, self-interference signal 152 may refer to the self-interference, unless otherwise described. Full-duplex system 100 includes a transmission (TX) signal path, a receiving (RX) signal path, and a feedback signal path (e.g., feedback path). The TX signal path includes digital TX circuit 102 and analog TX circuit 104. The RX signal path includes analog RX circuit 112 and digital RX circuit 114. Although certain components are illustrated as belonging to analog TX circuit 104, feedback receiver circuit 106, analog RX circuit 112, or digital RX circuit 114, it may be noted that components of a particular circuit may be part of another circuit. For example, ADC 130 may be considered part of the analog RX circuit 112. In another example, DAC 120 may be considered part of digital TX circuit 102. The feedback signal path includes feedback receiver circuit 106. Feedback receiver circuit 106 may obtain a copy of analog TX signal 151 and convert the analog TX signal 151 into a digital representation, i.e., digital TX signal 153. Feedback receiver circuit 106 sends digital TX signal 153 to digital RX circuit 114. Digital RX circuit 114 uses digital TX signal 153 to cancel at least the transmission noise component of self-interference signal 152 in the digital domain.

In one implementation, digital RX circuit 114 may include ADC 130, summation circuit 132, and digital RX signal processing circuit 134. Full-duplex system 100 may also include a circulator 108. The circulator 108 allows a signal to enter a first port and exit an adjacent second port. For example, circulator 108 allows analog TX signal 151 to enter into port one (e.g., connection between analog TX circuit 104 and circulator 108) and exit port two (e.g., connection between circulator 108 and antenna 110) to transmit analog TX signal 151 using antenna 110. Circulator 108 may attenuate analog TX signal 151 traveling from port one to port three. For example, self-interference signal 152 output at port three may be much weaker than analog TX signal 151 at port one or port two. In other implementations, rather than a circulator 108, other components for achieving isolation may be used, e.g. tunable or non-tunable duplex filters, or separate antenna structures, achieving some isolation between the signals. Antenna 110 may be a single antenna or multiple antennas. It may be noted that full-duplex system 100 illustrates various components for purposes of illustration, rather than limitation. It may be noted that the same, fewer, more, or different components may be implemented.

As noted above, full-duplex system 100 generates self-interference signal 152. When a full-duplex radio transmits analog TX signal 151, the analog RX circuit 112 of full-duplex system 100 may also receive the analog TX signal 151 (i.e., self-interference signal 152). The analog TX signal 151 transmitted by full-duplex system 100 may be a significantly distorted version of digital TX baseband signal 150. Self-interference signal 152 may include three noise components: a linear noise component, a non-linear noise component, and a transmitter noise component. A linear noise component corresponds to the frequency of the transmitted baseband signal, e.g., at or near frequency of the digital TX baseband signal 150 after up conversion by up converter 122 to the carrier frequency. The linear noise component is a known signal because the frequency of the baseband signal (e.g., digital TX baseband signal 150) is known. The linear noise component may be attenuated and include reflections (e.g., echoes) from the environment or from within the full-duplex system 100 itself. For example, the linear noise component may be a linear combination of the different delayed copies of the original transmitted baseband signal. The non-linear noise component may include harmonics of digital TX baseband signal 150. For example, analog TX circuit 104 may receive digital TX baseband signal 150 and output non-linear squared, cubic, and higher order terms. The harmonics may have significant frequency content close to the transmitted baseband signal. Harmonics may be signal distortions that occur at equally spaced frequency intervals from the transmitted baseband frequency. Apart from harmonics, also so-called mixing products may be present. These mixing products appear when feeding at least two signal components with different frequencies to an element that has non-linear properties. It may be noted that since the transmitted baseband frequency is known, the non-linear noise components of self-interference signal 152 may also be known. A transmitter noise component (also referred to as broadband noise) may be random noise above and below the transmitted baseband signal. Full-duplex system 100 (e.g. RX signal path of full-duplex system 100) may have a noise floor under which wanted signals may not be distinguished from noise. The transmitter noise component may be an unwanted signal (e.g., noise) above the noise floor of the full-duplex radio. The transmitter noise component may be generated from high power components, such as power amplifier 124 or preceding components like up converter 122. The transmitter noise component is random and not known. Known noise signals may be inferred by an algorithm and canceled accordingly. Unknown noise signals are random, may not be inferred by an algorithm, and may be canceled by a copy of the unknown signal where the unknown signal is generated. It may be noted that a known noise signal may also be canceled by a copy of the known noise signal where the known noise signal is generated.

It may be noted that circulator 108 may not perfectly isolate analog TX signal 151 from analog RX circuit 112 (e.g., port one to port 3). During a wireless transmission (referred to as transmission hereinafter) of analog TX signal 151, circulator 108 may couple an attenuated version of analog TX signal 151 (e.g., self-interference signal 152) to analog RX circuit 112. Additionally, self-interference signal 152 may include echo copies of analog TX signal 151 received from the reflection of the analog TX signal 151 on objects in the environment subsequent transmission.

In one example, the self-interference signal 152 is 110 dB. Analog TX signal 151 may be transmitted at 20 dBm (decibels per one milliwatt=dBm) average power and the noise floor of full-duplex system 100 is around −90 dBm. The self-interference signal 152 may be canceled by 20 dBm−(−90 dBm)=110 dB to reduce the self-interference signal 152 to the same level as the noise floor and render the self-interference signal 152 negligible. If self-interference signal 152 is not completely canceled, residual self-interference acts as noise to a received signal and reduces the SNR and throughput of the full-duplex system 100. The linear noise component of self-interference signal 152 may be 110 dB, for example. The non-linear noise component of self-interference signal 152 may be 80 dB, for example. The transmitter noise component of self-interference signal 152 may be 50 dB, for example.

Summation circuits, such as summation circuit 132, may be implemented in various ways. In one implementation, summation circuit may be a coupler, such as a directional coupler. A coupler may split a signal into two copies with selectable power ratio. For example, the splitting of a signal, such as analog TX signal 151, may be used to tap a copy of the analog TX signal 151 after the power amplifier 124. The copy of analog TX signal 151 may be sent to feedback receiver circuit 106. In some examples, a very small fraction of the signal (e.g., attenuated analog TX signal 151) is tapped. The attenuated analog TX signal 151 may be sufficient to operate the feedback receiver 106. By using an attenuated analog TX signal 151, a small fraction of analog TX signal 151 may be lost for transmission, i.e. the transmit power is only slightly reduced. In other implementations, couplers may also be used to combine two signals into a single signal i.e. a summation operation or function. The summation operation of couplers may be used to implement the summation circuits, such as summation circuit 132. Couplers may also perform a subtraction operation. For example, a subtraction operation may be implemented by summing a signal after a 180-degree phase shift. It may be noted that other circuits may be used to implement the operations of summation circuits. For example, a connection of two signals via two resistors may perform similar operations as described above with respect to summation circuits. In some examples, summation circuit 232D or 232A or 232B of FIG. 2 may be implemented with two resistors. In other implementations in the digital domain, summation circuits, such as summation circuits 132, may be realized by digital adders. Like the other digital operations, the addition (or subtraction) operations may be performed by a processor e.g. a digital signal processor (DSP) or by dedicated hardware.

As noted above, digital TX circuit 102 sends digital TX baseband signal 150 to analog TX circuit 104. It may be noted that additional components may exist between digital TX circuit 102 and analog TX circuit 104. Analog TX circuit 104 converts digital TX baseband signal 150 into an analog signal (e.g., analog TX signal 151) using digital-to-analog converter (DAC) 120. Analog TX signal 151 is up-converted to a carrier frequency by up converter 122. Alternatively digital-to-analog converter (DAC) 120 and up converter 122 may be combined into a single unit, e.g. a so-called RF-DAC that generates the analog RF signal directly from the digital TX baseband signal 150. Power amplifier 124 amplifies analog TX signal 151 to the appropriate power level for transmission. The output of power amplifier 124 is coupled to circulator 108. At the output of power amplifier 124, analog TX signal 151 is transmitted though port one of circulator 108 to a port two of circulator 108, where antenna 110 may transmit analog TX signal 151 as a wireless signal.

The RX signal path of full-duplex system 100 may also receive at least an attenuated version of analog TX signal 151, illustrated as self-interference signal 152. Analog RX circuit 112 may receive self-interference signal 152 responsive to the transmission of analog TX signal 151. For example, the low-noise amplifier (LNA) 126 of analog RX circuit 112 may receive self-interference signal 152. LNA 126 may send self-interference signal 152 to down converter 128 to convert self-interference signal 152 from a carrier frequency to an analog representation of self-interference signal 152 in baseband. Down converter sends self-interference signal 152 in baseband to ADC 130 of digital RX circuit 114. ADC 130 converts the self-interference signal 152 to a digital representation. Similar to the TX signal path, the functionalities of multiple components in the RX signal path may be merged into one or more components having the combined functionalities of the individual components. Summation circuit 132 receives digital TX signal 153, and the digital representation of self-interference signal 152. It may be noted that in some implementations, digital TX signal 153 may include the linear noise component, non-linear noise component, and transmitter noise component and be used to cancel all or some of the noise components from self-interference signal 152. In other implementations, summation circuit 132 of digital RX circuit 114 may cancel at least transmitter noise component of the digital representation of self-interference signal 152 using digital TX signal 153 (as will be described further below). may be noted In other implementations, digital TX signal 153 may be used to cancel noise components (e.g., linear noise component, non-linear noise component, or transmitter noise component) is self-interference signal 152 that are directly from leakage of circulator 108 (e.g., from port 1 to port 3), and may be used to cancel echoes of analog TX signal 151. The echoes of analog TX signal 151 may be part of self-interference signal 152, be external echoes that stem from reflections after circulator 108. These echoes may be delayed and phase shifted. Both the delay and phase shift of the echoes may be taken into account by digital RX circuit 114. The noise components of self-interference signal 152 may be canceled to the noise floor of full-duplex system 100.

In one implementation, feedback receiver circuit 106 may tap analog TX circuit 104 at the output of power amplifier 124 to receive a copy of analog TX signal 151. Feedback receiver circuit 106 may convert the copy of analog TX signal 151 to a digital representation of analog TX signal 151 (e.g., digital TX signal 153). Digital TX signal 153 may be used by digital RX circuit 114 to digitally cancel (e.g., cancel in the digital domain) at least the transmission noise component of self-interference signal 152 associated with the transmission of analog TX signal 151 in full-duplex system 100. For example, summation circuit 132 of digital RX circuit 114 may be coupled to the ADC 138 of feedback receiver circuit 106 to receive digital TX signal 153. Digital RX circuit 114 may use digital TX signal 153 to digitally cancel at least the transmitter noise component of self-interference signal 152. In one implementation, feedback receiver circuit 106 receives a copy of analog TX signal 151 and down converts the copy of analog TX signal 151 into baseband using down converter 136. Down converter 136 provides analog TX signal 151 in baseband to ADC 138. ADC 138 converts analog TX signal 151 into a digital representation (e.g., digital TX signal 153). Feedback receiver circuit 106 sends digital TX signal 153 to summation circuit 132 of digital RX circuit 114 where the digital TX signal 153 is used to cancel at least the transmitter noise component of self-interference signal 152.

It may be noted that self-interference happens due to several phenomena occurring at different places within the TX and RX signal paths and outside of the full-duplex system 100, e.g. external echoes due to external reflections. The level of interference may vary by several orders of magnitude. For example, the further away a reflection occurs the weaker the self-interference. The different noise components of the transmitted signal, e.g., analog TX signal 151, may also have different magnitudes. For weaker echoes, the dominant noise components contribute significantly to self-interference. Weaker echoes may be easily cancelled in the digital domain by taking the digital TX baseband signal 150 into account (e.g., disregarding non-linear noise component and transmitter noise) (e.g., illustrated by arrow connecting digital baseband signal 150 to summation circuit 132). The cancellation using the digital TX baseband signal 150 may be performed after all transmission/reception and associated analog and digital signal processing. The cancellation may not be constraint by any real-time requirements. With respect to the present disclosure, the aforementioned cancellation may be referred to as outer cancellation or outer digital cancellation. As echoes may occur from a multiplicity of external reflectors with different delays, phases and amplitudes, the cancellation may be performed in the digital domain where it is comparatively easy to calculate multiple delayed and amplitude/phase adapted copies of a signal and in outer compensation, which is not time critical.

It also may be noted that other types of cancellation may be immersed into the RX/TX signal path (e.g., RX/TX processing chain). Cancellation that is immersed into the RX/TX signal path may be referred to as inner cancellation or inner digital cancellation. Inner cancellation may take advantage of intermediate signals, e.g., digital TX signal 153, or may be applied to the intermediate signals, as described further below.

As noted above, some or all the features of the present disclosure may be implemented in non-in-band full-duplex systems, such as duplex-free implementations of frequency-division duplex (FDD) systems or time-division duplex (TDD) systems. Non-in-band full-duplex systems may perform concurrent transmission and reception, although not necessarily on the same radio channel or frequency band. Non-in-band full-duplex systems may be susceptible to self-interference due to concurrent operation of transmission (TX) and reception (RX). In some examples, the self-interference of non-in-band full-duplex systems may be at least partly mitigated by filters e.g. duplex filters. However, duplex filters may contribute to the cost of the RF frontend. For example, if a device is to work in multiple (up to several tens of) frequency bands, a duplexer may be required for each band. In other examples, increasing data rates by spatial multiplexing may require several TX or RX antennas and several duplexers for a single frequency band. In an effort to reduce the number or cost of duplexers, duplexers may be replaced with circulators that can provide isolation in multiple frequency bands. Duplexers may also be replaced by tunable duplexers that can be tuned to different frequency bands. Tunable duplexers and circulators may not provide the isolation to operate the RX signal path with full sensitivity. Aspects of the present disclosure address the above deficiencies of non-in-band full-duplex systems, among other deficiencies.

In some implementations, a transmitter (not shown) may be used instead of or in addition to analog TX circuit 104. A transmitter may be an electronic device that produces radio signals (e.g. analog TX signal 151) using an antenna, such as antenna 110. Some, all, or none of the components of analog TX circuit 104 may be implemented in a transmitter. For example, the transmitter may include a power amplifier, such as power amplifier 124. It may be noted, that TX circuit may refer to all or part of digital TX circuit 102 or analog TX circuit 104. RX circuit may refer to all or part of analog RX circuit 112 or digital RX circuit 114.

Figure 2:
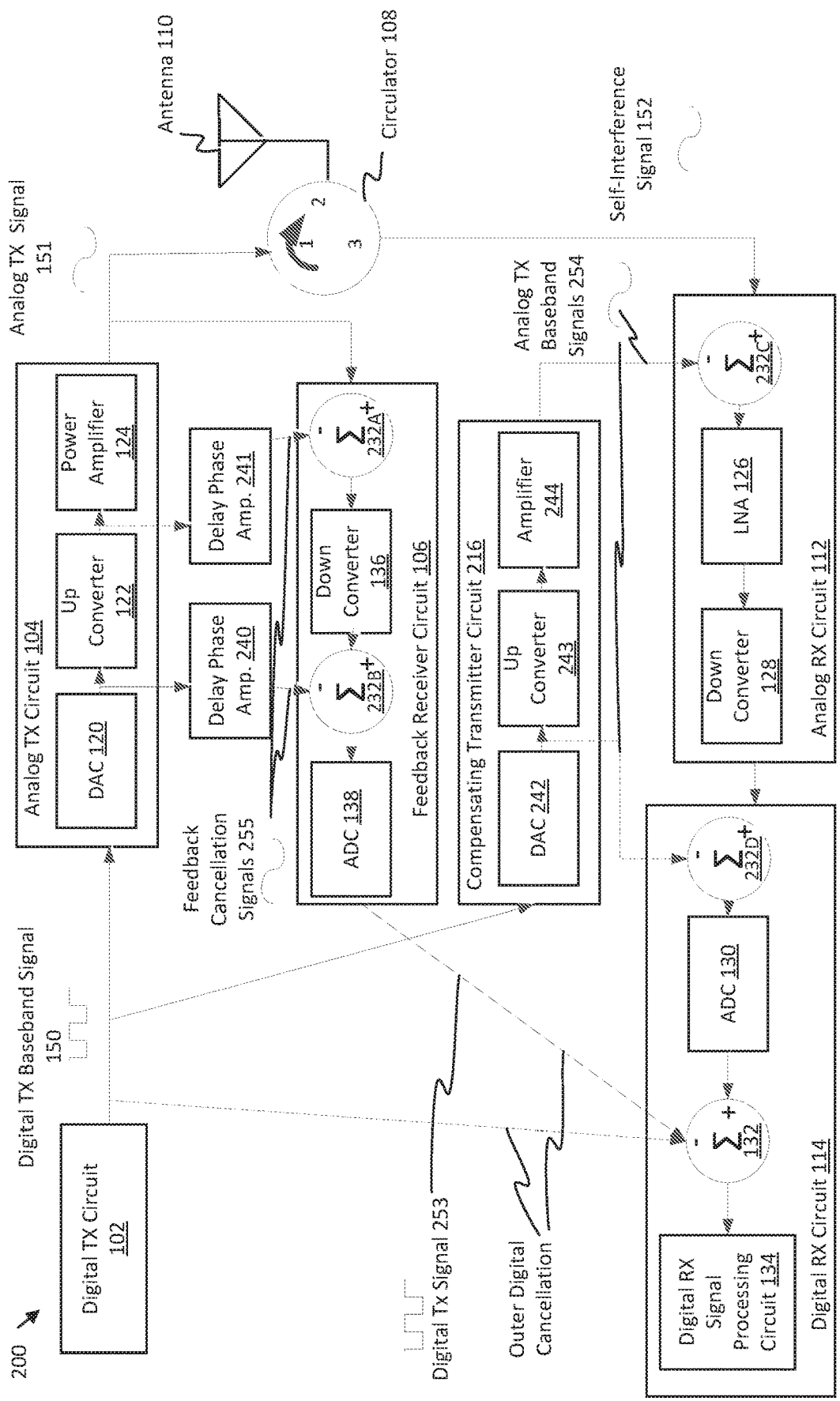
FIG. 2 is a block diagram illustrating a full-duplex system, according to other implementations.

FIG. 2 is a block diagram illustrating a full-duplex system, according to other implementations. It may be noted that FIG. 2 may have similar or corresponding features with respect to FIG. 1. Full-duplex system 200 includes delay phase amplifier 240, delay phase amplifier 241, one or more additional summation circuits 232, and compensating transmitter circuit 216. Compensating transmitter circuit 216 may include DAC 242, up converter 243, and amplifier 244 (e.g., tunable amplifier). In some implementations, amplifier 244 may be a tunable amplifier that may be able to provide tunable amplification to a received signal. In other implementations, amplifier 244 may be preceded or followed by a tunable attenuator to achieve amplification tuning. In some implementations, amplifier 244 may be an attenuator, e.g., an amplifier with an amplification ratio below 1 or below 0 dB. This may be the case if the signal coming from a preceding stage is strong enough so that no amplification is used. The term amplifier is used in this more general meaning throughout the disclosure, unless described otherwise. In still other implementations, amplifier 244 may include or be combined with a phase shifter in order to set the phase of, for example, the analog TX baseband signal 254, to optimize cancellation. In some implementations where cancellation of direct self-interference, i.e. self-interference not including external echoes, is desired, phase and amplitude tuning may not be implemented as phase and amplitude of the self-interference may be constant. In one implementation, full-duplex system 200 may cancel self-interference signal 152 and reduce the dynamic range requirement of ADC, such as ADC 138 or ADC 130. In other implementations, full-duplex system 200 may reduce the linearity requirement of components, such as LNA 126, mixer (not shown), or other components. Linearity requirement may refer to the ability of a circuit to amplify an input signal and generate an output signal without altering the content of the input signal.

In one implementation, feedback receiver circuit 106 may be implemented to digitally cancel at least the transmitter noise component of self-interference signal 152 associated with the transmission of analog TX signal 151 in full-duplex system 200. Feedback receiver circuit 106 may be configured to receive a copy of analog TX signal 151 at the output of power amplifier 124 of analog TX circuit 104 and a feedback cancellation signal 255 from analog TX circuit 104 at some point prior to the power amplifier 124. In some implementations, feedback receiver circuit 106 may use feedback cancellation signal 255 from an amplifier, such as delay phase amplifier 240 or delay phase amplifier 241 or both, to cancel a portion of analog TX signal 151 prior to ADC 138. In one implementation, delay phase amplifier 241 taps analog TX circuit 104 after up converter 122 and prior to power amplifier 124. The aforementioned tap, samples a "clean" analog TX signal 151 before the PA, a clean analog TX signal 151 may be a signal without the noise or distortions caused by power amplifier 124. Clean analog TX signal 151 may be used to cancel the dominant linear part of the analog TX signal 151 to better receive non-linear noise components of analog TX signal 151 and to reduce dynamic range of the ADC 138. In some implementations, delay phase amplifier 240 or delay phase amplifier 241 or both may be replaced by a tunable attenuator and phase shifter. In other implementations, instead of picking up the signal after the DAC 120 and before up converter 122, another dedicated DAC may be used. The dedicated DAC may be fed with a copy of the digital TX baseband signal 150 including the desired phase and amplitude change. The desired phase and amplitude change may be calculated in the digital domain, e.g. by multiplying with the desired amplitude modulation and by a complex multiplication with the desired phase rotation. A larger fraction of the cancellation may be performed in the digital domain taking advantage of Moore's law. Canceling a portion of analog TX signal 151 may reduce the signal strength of analog TX signal 151 and reduce the dynamic range requirement of ADC 138. For example, if analog TX signal 151 is reduced by 30 dB, the dynamic range requirement of ADC 138 may also be reduced by 30 dB (e.g., equivalent to a 5-bit reduction of ADC 138). It may be noted that the reduced dynamic range of the ADC, or equivalently reducing the number of bits of a DAC, allows for a reduction in power consumption. Delay phase amplifier 240 or 241 may provide signal delay or amplitude or phase alignment of feedback cancellation signal 255. Feedback receiver circuit 106 may use feedback cancellation signal 255 to cancel a portion of the analog TX circuit 104 using summation circuit 232B or 232A, depending on the implementation. The remaining portion of analog TX signal 151 (the portion remaining after canceling analog TX signal 151 using feedback cancellation signal 255) may be sent to ADC 138 to generate a digital representation of the remaining portion of analog TX signal 151 (e.g., digital TX signal 253). Feedback receiver circuit 106 may send digital TX signal 253 to digital RX circuit 114. Digital RX circuit 114 may use digital TX signal 253 to digitally cancel at least transmitter noise component of self-interference signal 152. It may be noted that, in some implementations, power amplifier 124 may be responsible for a majority, if not all, transmitter noise component of self-interference signal 152.

In one implementation, an amplifier, such as delay phase amplifier 240 or 241, is coupled between analog TX circuit 104 and feedback receiver circuit 106 to tap analog TX circuit 104 and to provide feedback cancellation signal 255 to feedback receiver circuit 106. In one implementation, delay phase amplifier 241 taps analog TX circuit 104 after up converter 122 and prior to power amplifier 124. In another implementation, delay phase amplifier 240 taps analog TX circuit 104 after DAC 120 and before up converter 122. In another implementation, analog TX circuit 104 may be tapped by both delay phase amplifier 240 and delay phase amplifier 241 at the aforementioned locations. In another implementation, analog TX circuit 104 may have multiple successively coupled up converters, e.g. first create a signal at an intermediate frequency that is subsequently up converted to the final frequency. Analog TX circuit 104 may be tapped at the intermediate frequency. In other embodiment, feedback receiver circuit 216 may similarly have multiple down-conversion stages and may combine the tapped signal at a corresponding down-conversion stage. For simplicity, intermediate frequencies are not explicitly mentioned, but it may be understood that all compensations may also be done at intermediate frequencies.

In other implementations, digital RX circuit 114 may use digital TX signal 253 to digitally cancel at least the transmitter noise component and the non-linear noise component of self-interference signal 152. In one implementation, non-linear noise component may be added to digital TX signal 253. In some implementations, the digital TX signal 253 is not a direct copy of the leaked analog TX signal 151. The digital TX signal 253 may be self-interference signal 152 less the feedback cancellation signal 255. To completely cancel self-interference signal 152 (e.g., including direct and echoes of the analog TX signal 151 that are reflected after the antenna), both direct and echoes of analog TX signal 151 may be canceled with a suitable phase and amplitude adaptation. The feedback cancellation signal 255 may not be measured explicitly by feedback receiver 106, because it can be derived from digital TX baseband signal 150. In some implementations, feedback cancellation signal 254 and digital TX baseband signal 150 are identical, besides the amplification and some phase shift. Therefore both signals may be combined by digital RX circuit 114, taking the phase and amplitude into account e.g. by multiplication with an amplitude and phase factor (not shown) before the digital cancellation in summation circuit 132. Deviations from the ideal TX signal, in particular non-linear noise (e.g. non-linear distortions) and transmitter noise may be captured by feedback receiver 106. The transmitter noise component may not be possible to predict from the digital TX baseband signal 150. In one implementation, the non-linear noise component may also be measured implementation by feedback receiver 106 that may help to reduce computation complexity in the digital domain. For example, while these distortions, such as a non-linear noise component may be calculated in the digital domain, calculating in the digital domain may require additional processing power and increase the power consumption.

In other implementations, compensating transmitter circuit 216 may be implemented to cancel at least part of the self-interference signal 152 (e.g., linear noise component) in the analog domain to reduce the dynamic range requirement of ADC 130 of digital TX circuit 102 or the linearity requirement of LNA 126 (or other components, such as a mixer in down converter 128). Digital TX circuit 102 may be coupled to compensating transmitter circuit 216 and provide digital TX baseband signal 150 to compensating transmitter circuit 216. Compensating transmitter circuit 216 may convert digital TX baseband signal 150 to an analog representation (e.g., analog TX baseband signal 254) using DAC 242. Phase and amplitude alignment can be performed by digital multiplication before DAC 242 or by tunable attenuator or amplifier and phase shifters.

In one implementation, after DAC 242 and prior to up converter 243 compensating transmitter circuit 216 may send analog TX baseband signal 254 to analog RX circuit 112 to cancel at least the linear noise component of self-interference signal 152 using analog TX baseband signal 254. It may be noted that in some implementations if a single tap is used after DAC 242 to summation circuit 232D, compensating transmitter circuit 216 may not include up converter 243 or amplifier 244, and analog TX baseband signal 254 may not be sent to summation circuit 232C. Analog TX baseband signal 254 may be received prior to ADC 130 of digital RX circuit 114 and after down converter 128 of analog RX circuit 112. In such an implementation, up converter 243 and amplifier 244 may be omitted from compensating transmitter circuit 216.

In another implementation, compensating transmitter circuit 216 may process digital TX baseband signal 150 using DAC 242, followed by up conversion by up converter 243, and amplification by amplifier 244 (e.g., tunable amplifier) to output analog TX baseband signal 254. Compensating transmitter circuit 216 may send analog TX baseband signal 254 to summation circuit 232C of analog RX circuit 112. Compensating transmitter circuit 216 sends analog TX baseband signal 254 to a position before LNA 126 of analog RX circuit 112 to cancel at least the linear noise component of self-interference signal 152 and reduce the linearity requirement of LNA 126. In some implementations, compensating transmitter circuit 216 may provide analog TX baseband signal 254 to summation circuit 232D and to summation circuit 232C, as described above. It may be noted that in other implementations, analog TX baseband signal 254 may contain the linear noise component and the non-linear noise component of self-interference signal 152 and be used to cancel linear noise component and non-linear noise component of self-interference signal 152 in a similar manner as described above. The non-linear noise component of self-interference signal 152 may be calculated from digital TX baseband signal 150 via digital processing by simulating the known non-linearities of power amplifier 124. It may also be appreciated that in other implementations, digital TX circuit 102 may send a signal (represented by the dashed line from digital TX circuit 102 to digital RX circuit 114) to cancel the non-linear noise component of self-interference signal 152.

Figure 3:
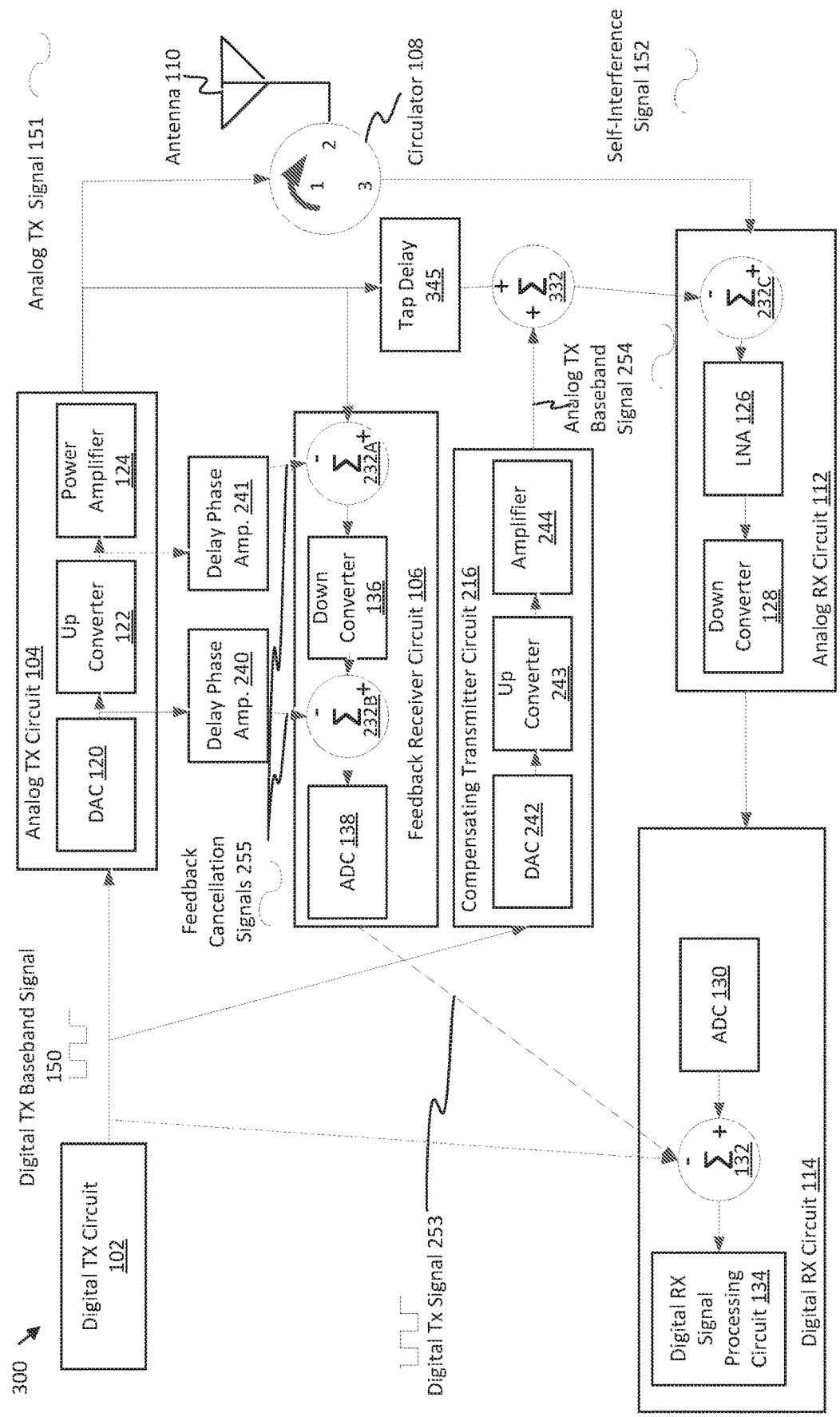
FIG. 3 is a block diagram illustrating a full-duplex system, according to implementations.

FIG. 3 is a block diagram illustrating a full-duplex system, according to implementations. In addition to at least some of the features described with respect to FIGS. 1 and 2, full-duplex system 300 includes tap delay 345 and summation circuit 332. Tap delay 345 may tap the output of analog TX circuit 104 to capture a copy of analog TX signal 151. Summation circuit 332 may combine analog TX signal 151 from tap delay 345 with analog TX baseband signal 254 from compensating transmitter circuit 216. Summation circuit 332 may send the combined signal to analog RX circuit 112 to cancel a portion of self-interference signal 152 via summation circuit 232C and reduce the dynamic range requirement of at least ADC 130, as well as components in compensating transmitter circuit 216 e.g. DAC 242. In other implementations, summation circuit 332 may be replaced by two individual summation circuits. Each one of the two individual summation circuits may be used to cancel the output of tap delay 345 or the output from compensating transmitter circuit 216.

In one implementation, tap delay 345 may be a single tap delay. Tap delay 345 may make delay and/or phase adjustments to analog TX signal 151. Tap delay 345 may be used to cancel self-interference from the direct path between the port 1 and port 3 of circulator 108, rather than echoes of analog TX signal 151. Cancellation of the linear noise component, the non-linear noise component, and the transmitter noise component may performed in a similar manner as described with respect to the above Figures. In other implementations, more than one tap delay 345 may be implemented.

Figure 4:
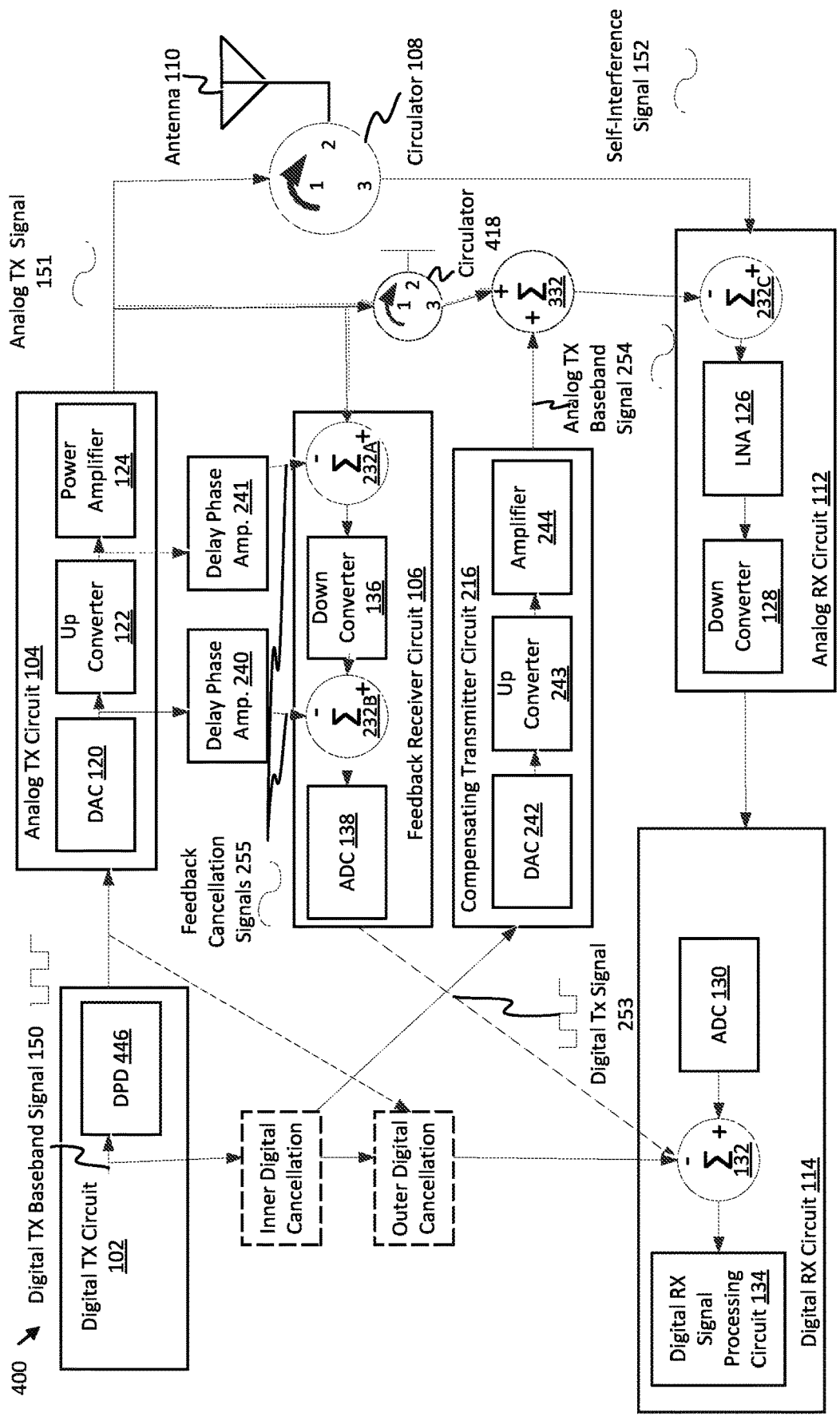
FIG. 4 is a block diagram illustrating a full-duplex system, according to some implementations.

FIG. 4 is a block diagram illustrating a full-duplex system, according to some implementations. In addition to at least some of the features described with respect to FIGS. 1-3, full-duplex system 400 includes circulator 418 and digital predistortion (DPD) circuit 446. In one implementation, circulator 418 may be implemented with similar elements as circulator 108. Rather than an antenna, circulator 418 may have a reflector at port two at which an antenna would otherwise be connected. Circulator 418 may generate a similar delay or phase change of analog TX signal 151 as circulator 108 generates with self-interference signal 152. Circulator 418 may tap analog TX circuit 104 at the output of power amplifier 124 for a copy of analog TX signal 151. Circulator 418 may output, at port three, analog TX signal 151 with delay or phase change similar to self-interference signal 152. Summation circuit 332 may combine analog TX signal 151 from circulator 418 with analog TX baseband signal 254 from compensating transmitter circuit 216. The combined signal may be used to cancel a portion of self-interference signal 152 and reduce the dynamic range requirement of at least ADC 138 and ADC 130, as well as components in compensating transmitter circuit 216. In some implementation, rather than implementing circulator 418 a filter with a similar delay as circulator 108 or a filter with a tunable delay may be implemented. It may be noted that instead of circulator 108, a duplexer can be used which may be implemented as Surface Acoustic Wave (SAW) filter or Bulk Acoustic Wave (BAW) filter or other technology. The filter delay may be similar to the delay caused by circulator or duplexer 108. It may be noted that circulator may refer to any implementation (e.g., filter, duplexer, etc.). In one implementation, identical or similar units for both circulator 108 and circulator 418 are used. Circulator 418 may not provide insulation of TX and RX signals from one another and may be simpler, cheaper, and smaller. Cancellation of the linear noise component, the non-linear noise component, and the transmitter noise component may be performed in a similar manner as described with respect to the above Figures.

In one implementation, digital TX circuit 102 may include DPD circuit 446. It may also be appreciated that DPD circuit 446 may also be implemented in one or more of the full-duplex systems described with respect to FIGS. 1-3. DPD circuit 446 may provide digital predistortion for transmission linearization of analog TX signal 151. DPD circuit 446 may provide DPD in parallel with inner digital cancellation, while outer digital cancellation considers DPD and imperfections of DPD later during RX processing. All digital processing may be completed before the transmission of analog TX signal 151. In other implementations, DPD circuit may include multi-stage DPD (e.g., using multiple iterations). In multi-stage DPD, a subset of the stages may be considered for inner digital cancellation. In another implementation, a model of the imperfections of the DPD may be used. The imperfections of the DPD may be considered as noise on top of the ideal TX signal and eventually subtracted in the digital domain, either due to measurements by the feedback receiver circuit 106 or by further, more precise calculations available at a later time. In FIG. 4, the digital TX baseband signal 150 may not be considered fully "clean", as it contains predistortion components that are used so that the final TX signal is undistorted or less distorted. When using the digital TX baseband signal 150 with predistortion components, or a feedback cancellation signal 255 derived therefrom, for cancellation in the feedback receiver circuit 106, the predistortion components may be canceled and are not actually present in the analogue TX signal 151. The cancellation step actually introduces the predistortion components into the digital TX signal 253. The introduced predistortion components may be cancelled in subsequent digital processing stages. For example, as the predistortion components are known because they have been deliberately introduced by the DPD, they can be subtracted later on in the digital RX circuit 114. For this purpose, outer digital cancellation may receive a copy of the predistorted signal or information about the predistortion components. The digital TX baseband signal 150 may still be considered "clean" as regards to TX noise and other components that are not targeted by DPD and still function as described in the present disclosure.

It may be noted that in some implementations of full-duplex system of FIGS. 1-4, adaptation loops (not shown) may be implemented. Adaptation loops may include channel adaptation, parameter adaptation, estimation, or correlation, for example. It may be noted that in some implementations of the full-duplex systems of FIGS. 1-4, outer digital cancellation loops may take into account cancellation already performed by inner cancellation (e.g., inner analog cancellation, inner digital cancellation), including inner loop imperfections, (e.g., canceling residual interference from imperfections of the inner loops). The aforementioned is illustrated in FIG. 4 by the order of the two dashed boxes labeled inner digital cancellation and outer digital cancellation. Outer digital cancellation may receive information about the performed inner digital cancellation and take into account that inner digital cancellation has already been performed by compensating transmitter circuit 216 and applied in analog RX circuit 112. Outer digital cancellation may omit cancelling of the components already cancelled by inner cancellation. In some examples including DPD, inner digital cancellation may not include the effect of DPD and achieve partial compensation. Outer digital cancellation may consider effects of DPD 446 and perform the outer digital cancellation later than inner digital cancellation, as described above. Outer digital cancellation loops may take additional information into account to reconstruct data as compared to the information available for inner digital cancellation loops. For example, the additional information includes information such as latest channel estimation such as samples received or processed after inner digital cancellation loops have been executed (e.g., even samples received after reception of the sample to be compensated). Channel prediction may be implemented for inner digital cancellation loops as the inner digital cancellation loops may be computed before the time of the actual transmission of a particular sample and therefore may rely on historic data. Additionally outer digital cancellation may also consider measurements from feedback receiver circuit 106 (i.e. digital TX signal 253) into account (not shown in FIG. 4) on top of or instead of information from DPD 446. Inner digital cancellation may have compensated the linear components for several echoes, and outer digital cancellation may additionally cancel the effect of non-linear components and/or TX noise for these echoes. To save processing power, outer digital cancellation may consider the additional components for a selection of echoes, in particular for the strongest echoes, or select echoes depending on both strengths of the echoes and the required receive sensitivity, i.e. based on the expected performance degradation if not canceling a specific component of a specific echo.

It may be noted that implementations described herein may be implemented in base stations, repeaters, and mobile devices, among others.

Figure 5:
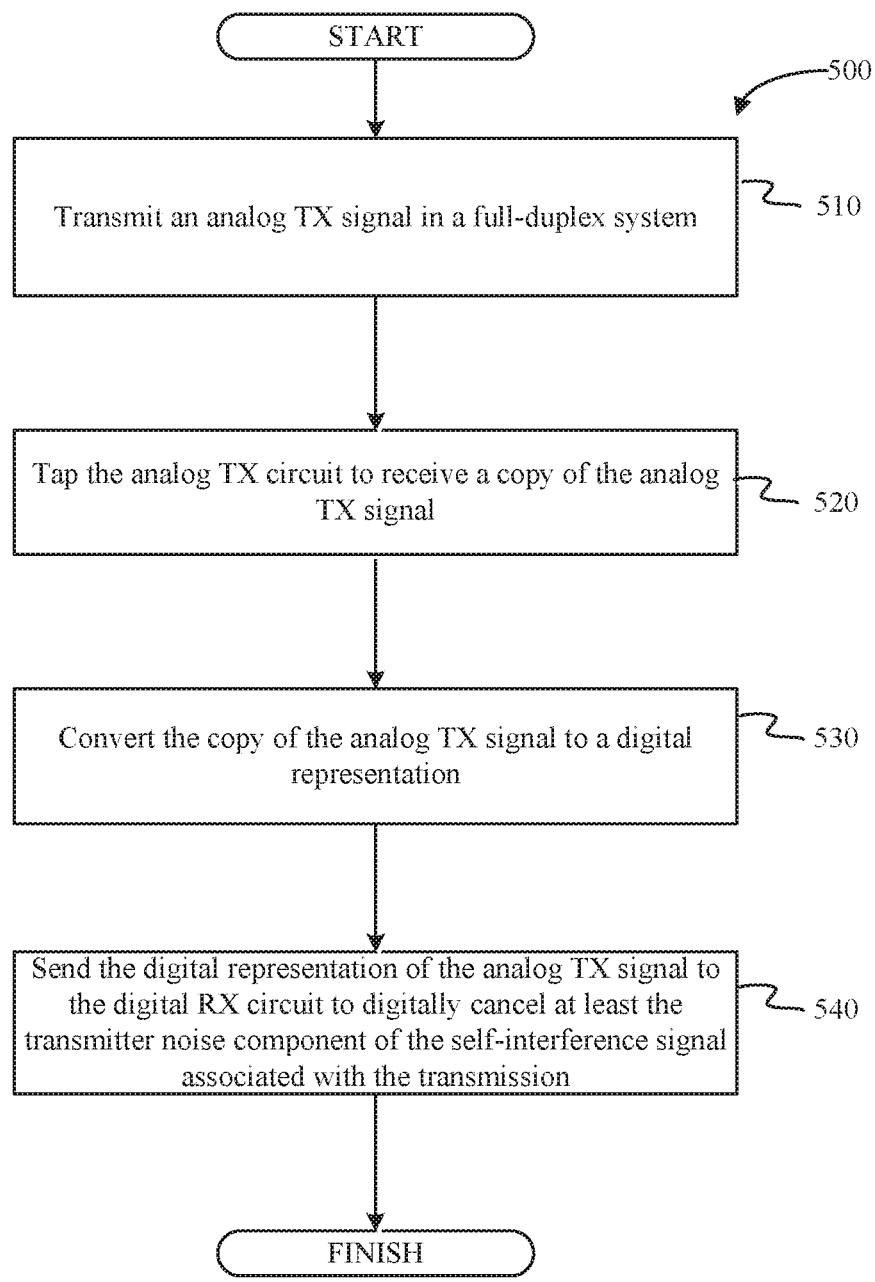
FIG. 5 is a flow diagram of operation of a full-duplex system, according to an implementation.

FIG. 5 is a flow diagram of operation of a full-duplex system, according to an implementation. It may be noted that features of FIGS. 1-4 may be described below to help illustrate method 500. Method 500 may be performed as operations. It may be noted that method 500 may be performed in any order and may include the same, more, or fewer operations. It may be noted that method 500 may be performed by one or more components of a full-duplex system described herein.

Method 500 begins at operation 510 where full-duplex system 100 transmits analog TX signal 151 (e.g., sends analog TX signal 151 to circulator 108 for wireless transmission using antenna 110). At operation 520, feedback receiver circuit 106 taps analog TX circuit 104 at the output of power amplifier 124 to receive a copy of analog TX signal 151. At operation 530, feedback receiver circuit 106 converts analog TX signal 151 into a digital representation (e.g., digital TX signal 153). At operation 540, feedback receiver circuit 106 sends digital TX signal 153 to digital RX circuit 114 to digitally cancel at least the transmitter noise component of self-interference signal 152 associated with the transmission. Additional details of method 500 may be described at least with respect to FIG. 1.

Figure 6:
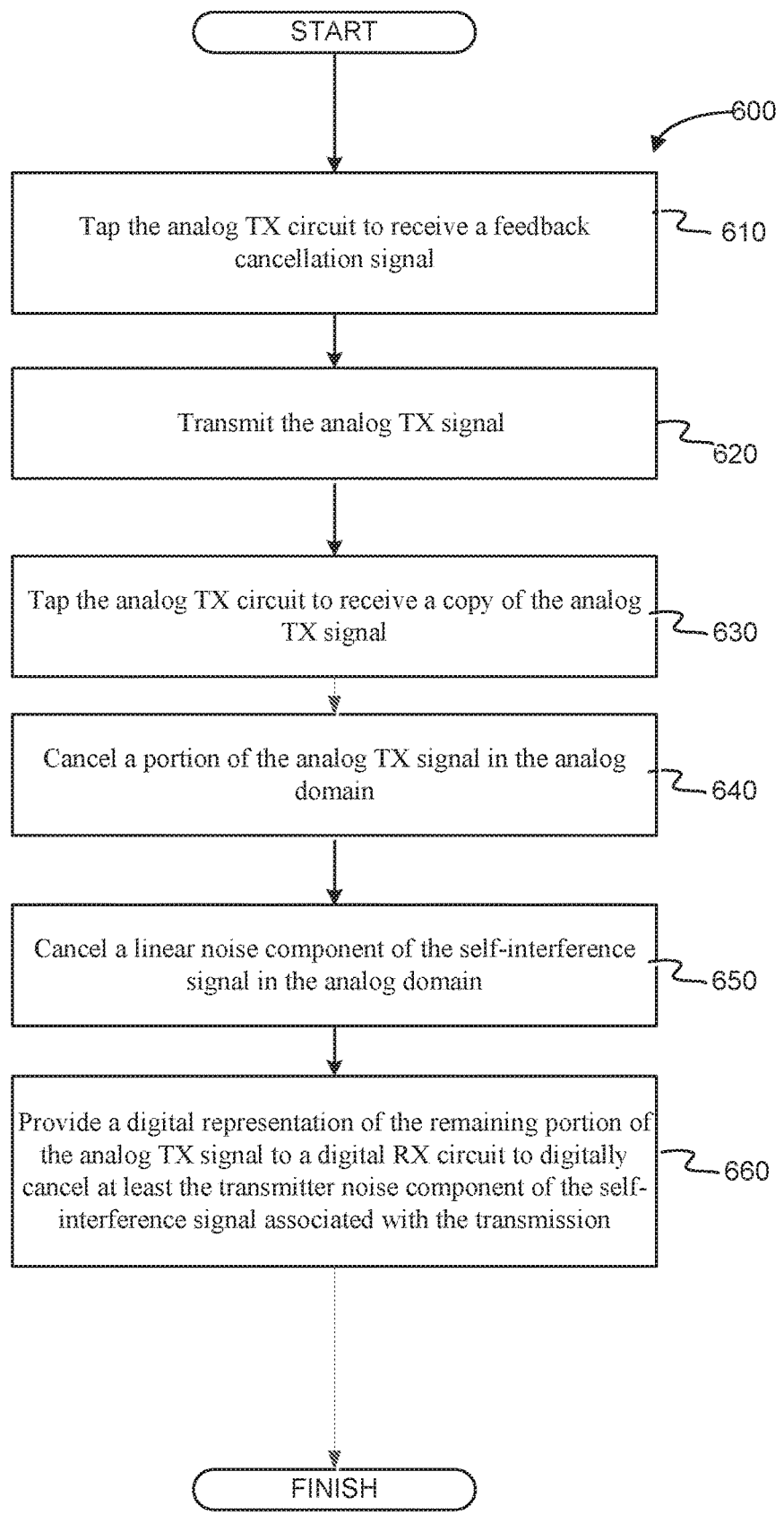
FIG. 6 is a flow diagram of operation of a full-duplex system, according to an implementation.

FIG. 6 is a flow diagram of operation of a full-duplex system, according to an implementation. It may be noted that features of FIGS. 1-4 may be described below to help illustrate method 600. Method 600 may be performed as operations. It may be noted that method 600 may be performed in any order and may include the same, more, or fewer operations. It may be noted that method 600 may be performed by one or more components of full-duplex system described herein.

Method 600 begins at operation 610 where feedback receiver circuit 106 of full-duplex system 200 taps analog TX circuit 104 to receive a feedback cancellation signal 255. At operation 620, full-duplex system 200 transmits analog TX signal 151. At operation 630, feedback receiver circuit 106 taps analog TX circuit 104 at the output of power amplifier 124 to receive a copy of analog TX signal 151. At operation 640, feedback receiver circuit 106 uses feedback cancellation signal 255 to cancel a portion of the analog TX signal 151 in the analog domain. At operation 650, compensating transmitter circuit 216 receives digital TX baseband signal 150 and converts digital TX baseband signal 150 into an analog representation (e.g. analog TX baseband signal 254). Compensating transmitter circuit 216 sends analog TX baseband signal 254 to the RX signal to cancel in the analog domain a linear noise component of the self-interference signal 152. At operation 660, feedback receiver circuit 106 provides a digital representation of the remaining portion of analog TX signal 151 (e.g., digital TX signal 253) to digital RX circuit 114 to digitally cancel at least the transmitter noise component of self-interference signal 152 associated with the transmission. Additional details of method 600 may be described at least with respect to FIG. 2 and additionally FIGS. 3 and 4.

Figure 7:
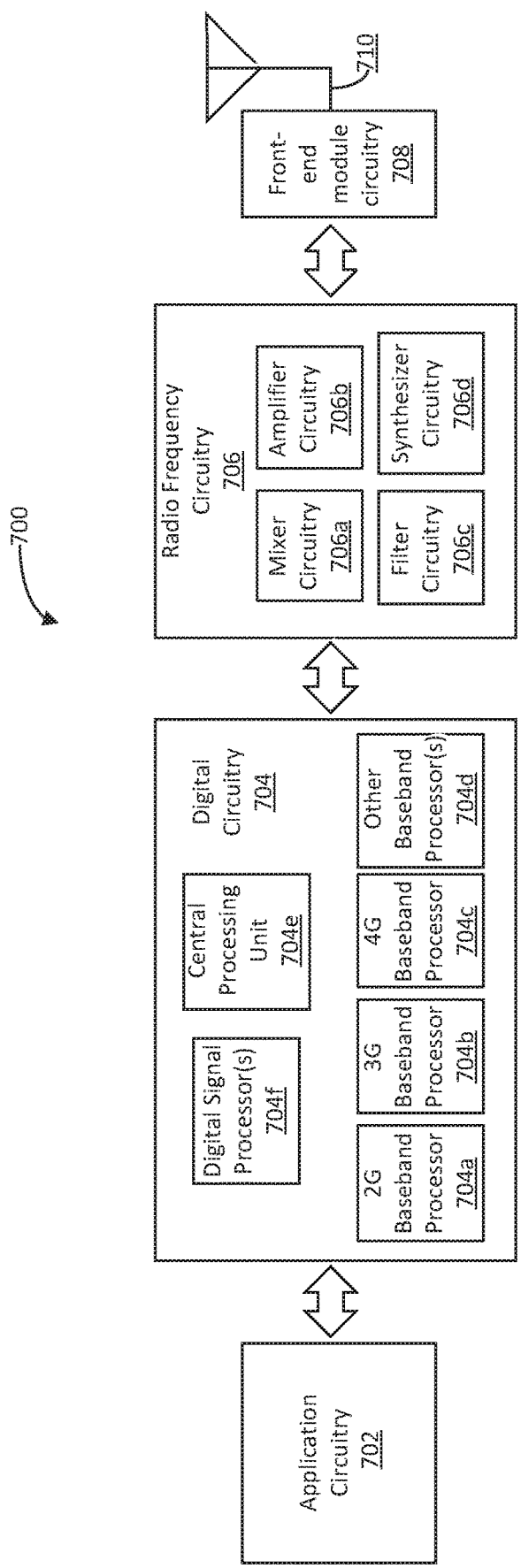
FIG. 7 is a system diagram in which a full-duplex system may be implemented.

FIG. 7 is a system diagram in which a full-duplex system may be implemented. In one implementation, user equipment (UE) device 700 may include a full-duplex system as described herein. In some implementations, the UE device 700 may include application circuitry 702, digital circuitry 704, Radio Frequency (RF) circuitry 706, front-end module (FEM) circuitry 708 and one or more antennas 710, coupled together at least as shown. In some implementations, digital TX circuit 102 and digital RX circuit 114 described with respect to FIGS. 1-4 may be included in digital circuitry 704. In some implementations, all or some of analog TX circuit 104, feedback receiver circuit 106, analog RX circuit 112, or circulator 108 described with respect to FIGS. 1-4 may be included in RF circuitry 706 or FEM circuitry 708. It may be noted features described with respect to FIGS. 1-4 may be part of any of application circuitry 702, digital circuitry 704, Radio Frequency (RF) circuitry 706, or front-end module (FEM) circuitry 708. It may be noted that multiple instances of the mentioned circuitries may be present in the full duplex system. It may be noted that UE device 700 may also be a base station or access point or a repeater (also called a relay), possibly also containing a wired or wireless backhaul interface e.g. connected to application circuitry 702. In the case of a repeater, TX and RX signals may contain the same user-data, but may be received from a terminal and forwarded (transmitted) towards a base station and vice versa. In FDD or TDD systems, repeaters may operate on the same frequency for this forwarding of data, both from the base station to device (downlink) and vice versa (uplink) even though up- and downlink may operate on different frequencies or at different times, e.g., they may implement a hybrid of same-frequency full duplex and conventional duplex methods.

The application circuitry 702 (also referred to as processing device) may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The digital circuitry 704 may include circuitry such as, but not limited to, one or more single-core or multi-core processors. The digital circuitry 704 may include one or more baseband processors and/or control logic to process baseband signals received from a receive signal path of the RF circuitry 706 and to generate baseband signals (e.g., digital TX baseband signal 150) for a transmit signal path of the RF circuitry 706. Digital circuitry 704 may interface with the application circuitry 702 for generation and processing of the baseband signals and for controlling operations of the RF circuitry 706. For example, in some implementations, the digital circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The digital circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some implementations, modulation/demodulation circuitry of the digital circuitry 704 may include Fast-Fourier Transform (FFT), preceding, and/or constellation mapping/demapping functionality. In some implementations, encoding/decoding circuitry of the digital circuitry 704 may include convolution, tail-biting convolution, turbo, Viterbi, and/or Low Density Parity Check (LDPC) encoder/decoder functionality. Implementations of modulation/demodulation and encoder/decoder functionality are not limited to these examples and may include other suitable functionality in other implementations.

In some implementations, the digital circuitry 704 may include elements of a protocol stack such as, for example, elements of an evolved universal terrestrial radio access network (EUTRAN) protocol (or successor protocols like 5$^{th}$ Generation) (5G) including, for example, physical (PHY), media access control (MAC), radio link control (RLC), packet data convergence protocol (PDCP), and/or radio resource control (RRC) elements. A central processing unit (CPU) 704e of the digital circuitry 704 may be configured to run elements of the protocol stack for signaling of the PHY, MAC, RLC, PDCP, NAS and/or RRC layers. In some implementations, the digital circuitry may include one or more audio digital signal processor(s) (DSP) 704f. The audio DSP(s) 704f may include elements for compression/decompression and echo cancellation and may include other suitable processing elements in other implementations. Components of the digital circuitry may be suitably combined in a single chip, a single chipset, or disposed on a same circuit board in some implementations. In some implementations, some or all of the constituent components of the baseband circuitry 704 and the application circuitry 702 may be implemented together such as, for example, on a system on a chip (SoC).

In some implementations, the digital circuitry 704 may provide for communication compatible with one or more radio technologies. For example, in some implementations, the digital circuitry 704 may support communication with an evolved universal terrestrial radio access network (EU-TRAN) and/or other wireless metropolitan area networks (WMAN), a wireless local area network (WLAN), a wireless personal area network (WPAN). Implementations in which the digital circuitry 704 is configured to support radio communications of more than one wireless protocol may be referred to as multi-mode digital circuitry.

RF circuitry 706 may enable communication with wireless networks using modulated electromagnetic radiation through a non-solid medium. In various implementations, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the digital circuitry 704. RF circuitry 706 may also include a transmit signal path which may include circuitry to up-convert baseband signals provided by the digital circuitry 704 and provide RF output signals to the FEM circuitry 708 for transmission.

In some implementations, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some implementations, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the digital circuitry 704 for further processing. In some implementations, the output baseband signals may be zero-frequency baseband signals, although this is not a requirement. In some implementations, mixer circuitry 706a of the receive signal path may comprise passive mixers, although the scope of the implementations is not limited in this respect.

In some implementations, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the digital circuitry 704 and may be filtered by filter circuitry 706c. The filter circuitry 706c may include a low-pass filter (LPF), although the scope of the implementations is not limited in this respect.

In some implementations, the mixer circuitry 706a of the receive signal path and the mixer circuitry 706a of the transmit signal path may include two or more mixers and may be arranged for quadrature down conversion and/or up conversion respectively. In some implementations, the mixer circuitry 706a of the receive signal path and the mixer circuitry 706a of the transmit signal path may include two or more mixers and may be arranged for image rejection (e.g., Hartley image rejection). In some implementations, the mixer circuitry 706a of the receive signal path and the mixer circuitry 706a may be arranged for direct down conversion and/or direct up conversion, respectively. In some implementations, the mixer circuitry 706a of the receive signal path and the mixer circuitry 706a of the transmit signal path may be configured for super-heterodyne operation.

In some implementations, the output baseband signals and the input baseband signals may be analog baseband signals, although the scope of the implementations is not limited in this respect. In some alternate implementations, the output baseband signals and the input baseband signals may be digital baseband signals. In these alternate implementations, the RF circuitry 706 may include analog-to-digital converter (ADC) and digital-to-analog converter (DAC) circuitry and the digital circuitry 704 may include a digital baseband interface to communicate with the RF circuitry 706.

In some dual-mode implementations, a separate radio IC circuitry may be provided for processing signals for each spectrum, although the scope of the implementations is not limited in this respect.

In some implementations, the synthesizer circuitry 706d may be a fractional-N synthesizer or a fractional N/N+1 synthesizer, although the scope of the implementations is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some implementations, the synthesizer circuitry 706d may be a fractional N/N+1 synthesizer.

In some implementations, frequency input may be provided by a voltage controlled oscillator (VCO), although that is not a requirement. Divider control input may be provided by either the digital circuitry 704 or the application circuitry 702 depending on the desired output frequency. In some implementations, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some example implementations, the DLL may include a set of cascaded, tunable, delay elements, a phase detector, a charge pump and a D-type flip-flop. In these implementations, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some implementations, synthesizer circuitry 706d may be configured to generate a carrier frequency as the output frequency, while in other implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency ($f_{LO}$). In some implementations, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some implementations, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some implementations, the UE device 700 may include additional elements such as, for example, memory/storage, display, camera, sensor, and/or input/output (I/O) interface.

In additional implementations, one or more processing devices for performing the operations of the above described implementations are disclosed. Additionally, in implementations of the disclosure, a non-transitory computer readable storage medium stores instructions for performing the operations of the described implementations. Also in other implementations, systems for performing the operations of the described implementations are also disclosed In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "transmitting", "tapping", "converting", "sending", "canceling", "receiving", "providing", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A full-duplex radio device configured to cancel a self-interference signal in a digital domain, the full-duplex radio device comprising:
    a digital transmission circuit configured to output a digital transmission baseband signal;
    an analog transmission circuit coupled to the digital transmission circuit and configured to receive the digital transmission baseband signal and output an analog transmission signal;
    an analog receiver circuit configured to receive the self-interference signal via a circulator coupled between the analog transmission circuit and the analog receiver circuit, and wherein the analog receiver is configured to convert the self-interference signal from a carrier frequency to an analog representation of the self-interference signal in baseband;
    a feedback receiver circuit, coupled to the analog transmission circuit and configured to output a digital representation of the analog transmission signal; and
    a digital receiver circuit coupled to the digital transmission circuit, the analog receiver circuit, and the feedback receiver circuit, wherein the digital receiver circuit is configured to:
        convert the analog representation of the self-interference signal in baseband received from the analog receiver circuit to a digital representation of the self-interference signal in baseband; and
        combine the digital representation of the self-interference signal in baseband, the digital representation of the analog transmission signal received from the feedback receiver circuit, and the digital transmission baseband signal received from the digital transmission circuit to cancel at least a transmitter noise component of the self-interference signal associated with a transmission of the analog TX signal in the full-duplex radio device.

2. The full-duplex radio device of claim 1, wherein the full-duplex radio device is an in-band full-duplex device configured to concurrently transmit and receive signals in a same frequency band.

3. The full-duplex radio device of claim 1,
wherein the feedback receiver circuit is further configured to:
   tap the analog transmission circuit to receive a copy of the analog transmission signal; and
   convert the copy of the analog transmission signal to the digital representation of the analog transmission signal.

4. The full-duplex radio device of claim 1,
wherein the analog transmission circuit comprises:
   a digital to analog converter configured to receive the digital transmission baseband signal and convert the digital transmission baseband signal to an analog signal;
   an upconverter coupled to the digital to analog converter and configured to upconvert the analog signal outputted by the digital to analog converter; and
   a power amplifier coupled to the upconverter and configured to receive the upconverted analog signal outputted by the upconverter and amplify the upconverted analog signal to generate the analog transmission signal.

5. The full-duplex radio device of claim 1,
wherein the feedback receiver circuit comprises:
   a downconverter configured to receive the analog transmission signal and down convert the analog transmission signal; and
   an analog to digital converter configured to convert the down converted analog transmission signal to the digital transmission signal.

6. The full-duplex radio device of claim 1,
wherein the analog receiver circuit comprises:
   a low noise amplifier configured to receive the self interference signal and output an amplified signal; and
   a down converter configured to receive the amplified signal and down convert the amplified signal to the analog representation of the self-interference signal in baseband.

7. The full-duplex radio device of claim 1,
wherein the circulator is configured to attenuate the analog transmission signal to generate the self-interference signal.

8. The full-duplex radio device of claim 1,
wherein the digital transmission signal includes a linear noise component, a non-linear noise component, and a transmitter noise component.

9. The full-duplex radio device of claim 1,
wherein the digital receiver circuit comprises a summation circuit, wherein, to combine the digital representation of the self-interference signal in baseband, the digital representation of the analog transmission signal received from the feedback receiver circuit, and the digital transmission baseband signal received from the digital transmission circuit to cancel at least a transmitter noise component of the self-interference signal associated with a transmission of the analog TX signal in the full-duplex radio device, the summation circuit is configured to:
   use the digital transmission signal to cancel at least a transmitter noise component of digital representation of the self-interference signal in baseband.

10. The full-duplex radio device of claim 1,
wherein the digital receiver circuit comprises a summation circuit, wherein, to combine the digital representation of the self-interference signal in baseband, the digital representation of the analog transmission signal received from the feedback receiver circuit, and the digital transmission baseband signal received from the digital transmission circuit to cancel at least a transmitter noise component of the self-interference signal associated with a transmission of the analog TX signal in the full-duplex radio device, the summation circuit is configured to:
   use the digital transmission signal to cancel noise components that are from leakage of the circulator and echoes of the analog transmission signal.

11. The full-duplex radio device of claim 10,
wherein the echoes of the analog transmission signal are part of self-interference signal or are external echoes that stem from reflections after the circulator.

12. The full-duplex radio device of claim 11,
wherein the echoes are delayed and phase shifted.

13. A method for a full-duplex radio device, comprising:
providing, to a digital receiver circuit, a digital transmission baseband signal via a digital transmission circuit, an analog transmission signal via an analog transmission circuit, an analog representation of a self-interference signal in baseband via an analog receiver circuit, and a digital representation of the analog transmission signal via a feedback receiver circuit;
converting the analog representation of the self-interference signal in baseband received provided via the analog receiver circuit to a digital representation of the self-interference signal in baseband; and
combining the digital representation of the self-interference signal in baseband, the digital representation of the analog transmission signal received from the feedback receiver circuit, and the digital transmission baseband signal received from the digital transmission circuit to cancel at least a transmitter noise component of the self-interference signal associated with a transmission of the analog TX signal in the full-duplex radio device.

14. The method of claim 13,
wherein combining combine the digital representation of the self-interference signal in baseband, the digital representation of the analog transmission signal received from the feedback receiver circuit, and the digital transmission baseband signal received from the digital transmission circuit to cancel at least a transmitter noise component of the self-interference signal associated with a transmission of the analog TX signal in the full-duplex radio device comprises using the digital transmission signal to cancel at least a transmitter noise component of digital representation of the self-interference signal in baseband.

15. The method of claim 13,
wherein combining combine the digital representation of the self-interference signal in baseband, the digital representation of the analog transmission signal received from the feedback receiver circuit, and the digital transmission baseband signal received from the digital transmission circuit to cancel at least a transmitter noise component of the self-interference signal associated with a transmission of the analog TX signal in the full-duplex radio device comprises using the digital transmission signal to cancel noise components that are from leakage of a circulator and echoes of the analog transmission signal.

16. The method of claim 15,
wherein the echoes of the analog transmission signal are part of self-interference signal or are external echoes that stem from reflections after the circulator.

17. The method of claim 16,
wherein the echoes are delayed and phase shifted.

18. A user equipment device (UE), comprising:
a digital transmission circuit configured to output a digital transmission baseband signal;
an analog transmission circuit coupled to the digital transmission circuit and configured to receive the digital transmission baseband signal and output an analog transmission signal;
an analog receiver circuit configured to receive the self-interference signal via a circulator coupled between the analog transmission circuit and the analog receiver circuit, and wherein the analog receiver is configured to convert the self-interference signal from a carrier frequency to an analog representation of the self-interference signal in baseband;
a feedback receiver circuit, coupled to the analog transmission circuit and configured to output a digital representation of the analog transmission signal; and
a digital receiver circuit coupled to the digital transmission circuit, the analog receiver circuit, and the feedback receiver circuit, wherein the digital receiver circuit is configured to:
convert the analog representation of the self-interference signal in baseband received from the analog receiver circuit to a digital representation of the self-interference signal in baseband; and
combine the digital representation of the self-interference signal in baseband, the digital representation of the analog transmission signal received from the feedback receiver circuit, and the digital transmission baseband signal received from the digital transmission circuit to cancel at least a transmitter noise component of the self-interference signal associated with a transmission of the analog TX signal in the full-duplex radio device.

19. The UE of claim 18,
wherein the full-duplex radio device is an in-band full-duplex device configured to concurrently transmit and receive signals in a same frequency band.

20. The UE of claim 18,
wherein the feedback receiver circuit is further configured to:
tap the analog transmission circuit to receive a copy of the analog transmission signal; and
convert the copy of the analog transmission signal to the digital representation of the analog transmission signal.

21. The UE of claim 18,
wherein the analog transmission circuit comprises:
a digital to analog converter configured to receive the digital transmission baseband signal and convert the digital transmission baseband signal to an analog signal;
an upconverter coupled to the digital to analog converter and configured to upconvert the analog signal outputted by the digital to analog converter; and
a power amplifier coupled to the upconverter and configured to receive the upconverted analog signal outputted by the upconverter and amplify the upconverted analog signal to generate the analog transmission signal.

22. The UE of claim 18,
wherein the feedback receiver circuit comprises:
a downconverter configured to receive the analog transmission signal and down convert the analog transmission signal; and
an analog to digital converter configured to convert the down converted analog transmission signal to the digital transmission signal.

* * * * *